(12) United States Patent
Rothschild

(10) Patent No.: US 11,942,232 B2
(45) Date of Patent: *Mar. 26, 2024

(54) X-RAY SCANNING SYSTEM WITH HIGH X-RAY ENERGY

(71) Applicant: Viken Detection Corporation, Burlington, MA (US)

(72) Inventor: Peter John Rothschild, Newton, MA (US)

(73) Assignee: Viken Detection Corporation, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,858

(22) Filed: Oct. 4, 2022

(65) Prior Publication Data
US 2023/0138961 A1 May 4, 2023

Related U.S. Application Data

(63) Continuation of application No. 16/935,865, filed on Jul. 22, 2020, now Pat. No. 11,495,366, which is a
(Continued)

(51) Int. Cl.
G21K 1/04 (2006.01)
G01V 5/00 (2006.01)

(52) U.S. Cl.
CPC ........... *G21K 1/043* (2013.01); *G01V 5/0025* (2013.01); *G01V 5/0041* (2013.01)

(58) Field of Classification Search
CPC .. G01V 5/0025; G01V 5/0008; G01V 5/0016; G01V 5/0066; G01V 5/0033;
(Continued)

(56) References Cited

U.S. PATENT DOCUMENTS 4,031,401 A 6/1977 Jacob
4,242,583 A 12/1980 Annis et al.
(Continued)

FOREIGN PATENT DOCUMENTS

CN 201340400 Y 11/2009
CN 107209282 9/2017
(Continued)

OTHER PUBLICATIONS

Case, G. L., et al., "Wavelength-Shifting Fiber Readout of LaCl and LaBr scintillators," Proc. of SPIE, UV, X-Ray, and gamma-Ray Space Instrumentation for Astronomy XIV, 58980K; vol. 5898, 8 pages (2005).
(Continued)

*Primary Examiner* — Irakli Kiknadze
(74) *Attorney, Agent, or Firm* — Sunstein LLP

(57) ABSTRACT

An x-ray scanning system, and corresponding method, includes an x-ray source that produces incident x-ray radiation having end-point x-ray energy, which, in various embodiments, can be greater than about 200 keV, between about 200 keV and about 500 keV, or greater than about 500 keV. The system also includes a disk chopper wheel that can be irradiated by and attenuate the incident x-ray radiation. The disk chopper wheel further defines one or more slits configured to pass the incident x-ray radiation through the disk chopper wheel for scanning a target. In some embodiments, the high end-point x-ray energies with disk chopper wheels are facilitated by forming the incident x-ray radiation as a collimated fan beam and/or orienting the chopper wheel with a wheel plane substantially non-perpendicular to a fan beam plane, increasing effective thickness of a disk chopper wheel to attenuate incident x-rays of higher energies.

27 Claims, 12 Drawing Sheets

Related U.S. Application Data continuation of application No. 15/527,566, filed as application No. PCT/US2015/061952 on Nov. 20, 2015, now Pat. No. 10,762,998.

(60) Provisional application No. 62/084,222, filed on Nov. 25, 2014, provisional application No. 62/082,321, filed on Nov. 20, 2014.

(58) Field of Classification Search
CPC .. G01V 5/0075; G01V 5/0041; G01V 5/0091; G01T 1/1606; G01T 7/00; G01T 1/208; G01T 1/20; G01T 1/2006; G01T 1/2008; G01T 1/201; G01T 1/2018; G01T 3/06; G01T 5/08; G01T 1/295; G01T 1/203; G01N 23/20008; G01N 23/04; G01N 23/20083; G01N 23/203; G01N 2223/314; G01N 2223/045; G01N 2223/053; G01N 2223/50; G01N 33/227; G01N 2223/643; G01N 23/06; G01N 2223/408; G01N 2223/631; G01N 2223/303; G01N 2223/1016; G01N 2223/301; G01N 2223/316; G01N 23/083; G01N 23/10; G01N 23/046; G01N 2223/419; G01N 2223/421; G01N 2223/3301; G01N 2223/401; G21K 1/043; G21K 1/04; G21K 1/02; G21K 1/10; H01J 35/16; H01J 35/101; H01J 35/26; H01J 2235/162; H01J 2235/166; H01J 35/064; H01J 35/153; H01J 35/147; H01J 35/00; H01L 27/146; H01L 27/14601; H01L 27/14643; H01L 27/14658; H05G 1/26; A61B 6/06; G02B 26/10; G02B 27/30
USPC ............................................ 378/147–160, 87
See application file for complete search history.

(56) References Cited

U.S. PATENT DOCUMENTS

| | | |
|---|---|---|
| 4,260,898 A | 4/1981 | Annis |
| 4,314,146 A | 2/1982 | Berney |
| 4,315,146 A | 2/1982 | Rudin |
| 4,342,914 A | 8/1982 | Bjorkholm |
| 4,472,822 A | 9/1984 | Swift |
| 4,503,332 A | 3/1985 | Annis |
| 4,646,339 A | 2/1987 | Rice |
| 4,799,247 A | 1/1989 | Annis et al. |
| 4,809,312 A | 2/1989 | Annis |
| 5,022,062 A | 6/1991 | Annis |
| 5,103,099 A | 4/1992 | Bourdinaud et al. |
| 5,179,581 A | 1/1993 | Annis |
| 5,181,234 A | 1/1993 | Smith |
| 5,224,144 A * | 6/1993 | Annis ............... G01V 5/0016 378/146 |
| 5,391,878 A | 2/1995 | Petroff |
| 5,666,393 A | 9/1997 | Annis |
| 5,692,028 A | 11/1997 | Geus et al. |
| 5,764,683 A | 6/1998 | Swift et al. |
| 5,783,829 A | 6/1998 | Sealock et al. |
| 5,903,623 A | 5/1999 | Swift et al. |
| 6,078,052 A | 6/2000 | DiFilippo |
| 6,192,104 B1 | 2/2001 | Adams et al. |
| 6,252,929 B1 | 6/2001 | Swift et al. |
| 6,272,206 B1 | 8/2001 | Bjorkholm |
| 6,292,533 B1 | 9/2001 | Swift et al. |
| 6,434,219 B1 * | 8/2002 | Rothschild ............ G21K 1/04 378/160 |
| 6,451,040 B1 | 9/2002 | Purcell et al. |
| 6,461,040 B1 | 10/2002 | Mattson et al. |
| 6,525,320 B1 | 2/2003 | Juni |
| 7,099,434 B2 | 8/2006 | Adams et al. |
| 7,115,875 B1 | 10/2006 | Worstell |
| 7,200,201 B2 | 4/2007 | Unger et al. |
| 7,218,704 B1 | 5/2007 | Adams et al. |
| 7,286,636 B2 | 10/2007 | Unger et al. |
| 7,310,407 B2 | 12/2007 | Juni |
| 7,593,510 B2 | 9/2009 | Rothschild |
| 7,995,707 B2 | 8/2011 | Rothschild et al. |
| 9,146,201 B2 | 9/2015 | Schubert et al. |
| 9,285,488 B2 | 3/2016 | Arodzero et al. |
| 10,739,491 B2 | 8/2020 | Yang et al. |
| 10,762,998 B2 * | 9/2020 | Rothschild ............ G01V 5/0041 |
| 10,762,999 B2 | 9/2020 | Kaszuba et al. |
| 10,770,195 B2 | 9/2020 | Rothschild |
| 10,794,843 B2 | 10/2020 | Rothschild et al. |
| 10,959,689 B2 | 3/2021 | Nariyuki et al. |
| 11,200,998 B2 | 12/2021 | Rothschild |
| 11,495,366 B2 * | 11/2022 | Rothschild ............ G01V 5/0025 |
| 11,776,706 B2 * | 10/2023 | Rothschild ............... G21K 1/04 378/160 |
| 2001/0016028 A1 | 8/2001 | Adams et al. |
| 2004/0017888 A1 | 1/2004 | Seppi et al. |
| 2006/0083354 A1 | 4/2006 | Tybinkowski et al. |
| 2006/0104415 A1 | 5/2006 | Unger et al. |
| 2006/0251214 A1 | 11/2006 | Unger et al. |
| 2008/0037707 A1 | 2/2008 | Rothschild et al. |
| 2008/0170661 A1 | 7/2008 | Unger et al. |
| 2009/0086906 A1 * | 4/2009 | Clayton ............ G01N 23/20083 378/57 |
| 2009/0086907 A1 | 4/2009 | Smith |
| 2009/0103686 A1 | 4/2009 | Rothschild |
| 2009/0175412 A1 | 7/2009 | Grodzins et al. |
| 2011/0058644 A1 | 3/2011 | Thran et al. |
| 2011/0103548 A1 | 5/2011 | Bendahan |
| 2012/0236990 A1 | 9/2012 | Rothschild |
| 2013/0134930 A1 | 5/2013 | Konkle et al. |
| 2013/0195248 A1 | 8/2013 | Rothschild et al. |
| 2013/0202089 A1 * | 8/2013 | Schubert ............ G01N 23/203 378/86 |
| 2013/0208857 A1 | 8/2013 | Arodzero et al. |
| 2013/0315368 A1 | 11/2013 | Turner |
| 2016/0070006 A1 | 3/2016 | Konkle et al. |
| 2017/0052125 A1 | 2/2017 | Georgeson et al. |
| 2017/0332986 A1 | 11/2017 | Grondin et al. |
| 2017/0358380 A1 * | 12/2017 | Rothschild ............ G01V 5/0041 |
| 2018/0294066 A1 * | 10/2018 | Rothschild ............... G21K 1/04 |
| 2019/0043633 A2 * | 2/2019 | Rothschild ............... G21K 1/04 |
| 2019/0242834 A1 | 8/2019 | Rothschild et al. |
| 2019/0346382 A1 | 11/2019 | Rothschild |
| 2020/0025968 A1 | 1/2020 | Yang et al. |
| 2020/0326291 A1 | 10/2020 | Rothschild |
| 2021/0005340 A1 | 1/2021 | Rothschild |
| 2021/0074445 A1 | 3/2021 | Rothschild |
| 2022/0003693 A1 | 1/2022 | Rothschild |
| 2022/0091054 A1 | 3/2022 | Rothschild et al. |
| 2022/0254536 A1 * | 8/2022 | Rothschild ............ G21K 1/043 |
| 2023/0106014 A1 * | 4/2023 | Hamilton ............ G01V 5/0025 378/160 |
| 2023/0138961 A1 * | 5/2023 | Rothschild ............ G21K 1/043 378/160 |

FOREIGN PATENT DOCUMENTS

| | | | | |
|---|---|---|---|---|
| CN | 107209282 A * | 9/2017 | ......... | G01V 5/0025 |
| CN | 108 318 512 A | 7/2018 | | |
| CN | 215066269 U * | 12/2021 | ......... | G01N 23/203 |
| EP | 2 667 184 A1 | 11/2013 | | |
| EP | 3 505 975 A1 | 7/2019 | | |
| GB | 2084829 | 4/1982 | | |
| JP | 2013522622 A * | 6/2013 | | |
| JP | 2013522624 A * | 6/2013 | | |
| WO | WO 2001/37287 A1 | 5/2001 | | |
| WO | WO-2003105159 A1 * | 12/2003 | | |
| WO | WO 2005/079437 A2 | 9/2005 | | |
| WO | WO 2011/053972 A2 | 5/2011 | | |
| WO | WO-2011115930 A2 * | 9/2011 | ......... | G01T 1/167 |
| WO | WO 2012/058207 A2 | 5/2012 | | |
| WO | WO 2012/174265 A1 | 12/2012 | | |

(56) References Cited

FOREIGN PATENT DOCUMENTS

| WO | WO 2014/058495 A2 | | 4/2014 | |
|---|---|---|---|---|
| WO | WO 2016/081881 A1 | | 5/2016 | |
| WO | WO-2016081881 A1 | * | 5/2016 | ........... G01V 5/0025 |
| WO | WO 2019/152900 A1 | | 8/2019 | |
| WO | WO 2019217596 | | 11/2019 | |
| WO | WO-2019217596 A1 | * | 11/2019 | ............. G01N 23/04 |
| WO | WO-2022061046 A1 | * | 3/2022 | ........... G01V 5/0025 |
| WO | WO-2022150845 A1 | * | 7/2022 | |

OTHER PUBLICATIONS

Hutchinson, D. P., et al., "Optical readout for Imaging Neutron Scintillation Detectors," Proc. of SPIE; vol. 4785; 262-267 (2002).
Keizer, F., "The Optimal Cosmic Ray Detector for High-Schools," HiSparc Collaboration, 2011.
Maekawa, T., et al., "Thin Beta-ray Detectors using Plastic Scintillator Combined with Wavelength-shifting Fibers for Surface Contamination Monitoring," *Journal of Nuclear Science and Technology*, vol. 35; No. 12; pp. 886-894 (1998).
Nishikido, F., et al., "X-ray Detector made of Plastic Scintillators and WLS fiber for real-time dose Distribution Monitoring in Interventional Radiology," IEEE Nuclear Science Symposium and Medical Imaging Conference (NSS/MIC), pp. 1272-1274 (2012).
Notification of Transmittal of the International Preliminary Report on Patentability for International Application No. PCT/US2015/061952, entitled: "X-Ray Scanning System," dated May 23, 2017.
Notification of Transmittal of the International Search Report and Written Opinion of the International Searching Authority for International Application No. PCT/US2015/061952, entitled: "X-Ray Scanning System," dated Mar. 7, 2016.
Stein, J. A. and Swift, R. D. "Flying Spot X-Ray Imaging Systems," *Materials Evaluation*, vol. 30; No. 7; 137-148 (1972).
Worstell, W., et al., "Scintillator Crystal Readout with Wavelength-Shifting Optical Fibers," IEEE, pp. 1869-1873 (1995).
U.S. Non-Final Office Action for U.S. Appl. No. 16/935,865, entitled "X-Ray Scanning System," dated Nov. 10, 2021.
U.S. Final Office Action for U.S. Appl. No. 16/935,865, entitled "X-Ray Scanning System," dated Mar. 24, 2022.
U.S. Notice of Allowance for U.S. Appl. No. 16/935,865, entitled "X-Ray Scanning System," dated Jul. 8, 2022.
Affidavit of Paul Bradshaw, Civil Action No. 1:19-cv-10614-NMG, dated Apr. 29, 2019 (7 pages).
International Preliminary Report on Patentability received for PCT Patent Application No. PCT/US2015/061952, dated Jun. 1, 2017, 8 pages.
International Search Report and Written Opinion received for PCT Patent Application No. PCT/US2015/061952, dated Mar. 7, 2016, 10 pages.
Mini Z Handheld Z Backscatter Screening System Overview, Civil Action No. 1:19-cv-10614-NMG, dated Apr. 29, 2019 (18 pages).

* cited by examiner

| END POINT ENERGY (keV) | TUNGSTEN THICKNESS (mm) | END POINT ENERGY (keV) | TUNGSTEN THICKNESS (mm) |
|---|---|---|---|
| 120 | 3.0 | 300 | 18.2 |
| 140 | 3.5 | 320 | 20.5 |
| 160 | 4.6 | 340 | 22.5 |
| 180 | 6.0 | 360 | 25.0 |
| 200 | 8.1 | 380 | 28.3 |
| 220 | 9.6 | 400 | 31.3 |
| 240 | 11.8 | 440 | 37.4 |
| 260 | 14.1 | 480 | 42.9 |
| 280 | 16.2 | | |

FIG. 6

X-RAY SCANNING SYSTEM WITH HIGH X-RAY ENERGY

RELATED APPLICATIONS

This application is a continuation of U.S. application Ser. No. 16/935,865, filed Jul. 22, 2020, which is a continuation of U.S. application Ser. No. 15/527,566, filed May 17, 2017, now U.S. Pat. No. 10,762,998, which is the U.S. National Stage of international Application No. PCT/US2015/061952, filed Nov. 20, 2015, which designates the U.S., published in English, and claims the benefit of U.S. Provisional Application No. 62/084,222, filed on Nov. 25, 2014, and U.S. Provisional Application No. 62/082,321, filed on Nov. 20, 2014. The entire teachings of the above applications are incorporated herein by reference.

BACKGROUND

X-ray backscatter (BX) imaging has been used since the 1980's for detecting concealed contraband, such as drugs, explosives, and weapons. The BX imaging technique differs in fundamental ways from the traditional transmission (TX) x-ray method of searching for contraband. The TX method works by creating an image of the x-rays that are transmitted through the target. Transmission images are created by a fan or cone beam of x-rays that pass through the target to a pixelated x-ray detector. The size of the individual detector elements determines the pixel resolution in the transmission image.

In contrast to TX images, backscatter images are created by scanning the target with a pencil beam of x-rays and measuring the intensity of the backscattered x-rays as a function of the position of the pencil beam on the target. Both x-ray scanners and backscatter detectors have been used on mobile platforms.

Scanning pencil beams of x-rays are created in several distinct ways, which have in common the creation of a fan beam of x-rays that is periodically cut (chopped) by a rotating slot or aperture created by a variety of means. The spatial resolution in the image is determined by the cross sectional area of the resulting scanning beam at the point that it strikes the target object being imaged.

SUMMARY

The apertures used to create the pencil beams for BX imaging are typically formed through materials that attenuate the initial x-ray beam by at least a factor of $10^8$. The needed thickness of the material, typically tungsten or lead, increases rapidly as the end-point x-ray energy increases. For example, only 3 mm of tungsten are needed for an end-point x-ray energy of 120 keV, but 12 mm of tungsten are needed when the end-point energy doubles to 240 keV. This required increase in thickness leads to greater system weight and chopper wheel moment of inertia, with related increases in system complexity and cost. These factors effectively limit the range of end-point x-ray energies that can reasonably be used.

Many embodiment systems described herein can use scanning x-ray beams with energies greater than about 100 keV. These scanning beams can be created by a rotating, x-ray opaque disk with radial slots, for example.

Moreover, in relation to detection of backscattered x-rays, prior-art, box-type, backscatter detectors are bulky and cannot therefore be easily mounted to the exterior of a vehicle for mobile imaging systems, particularly if the system needs to be used covertly. Therefore, existing backscatter detectors need to be concealed within the vehicle enclosure or to be stored in an external recessed cabinet. Both of these options require extensive modifications to the vehicle enclosure. It would therefore be advantageous, from a cost and simplicity viewpoint, to have detectors with a thin enough profile that they can be mounted directly onto the exterior of the vehicle enclosure, without modification to the enclosure.

In one embodiment system and corresponding method, an x-ray scanning system includes an x-ray source configured to produce a collimated fan beam of incident x-ray radiation. The system also includes a chopper wheel that is configured to be irradiated by the collimated fan beam. The chopper wheel is oriented with (i.e., in or parallel to) a "chopper" plane containing the chopper wheel (also referred to herein as a "wheel plane", where the wheel plane is substantially non-perpendicular relative to a plane containing the collimated fan beam of incident radiation (also referred to herein as a "beam plane").

The system can have an angle of less than 30° between the wheel plane and the beam plane. This angle can also be less than 15°.

The chopper wheel can be a disk with a rim and a center. The disk can include one or more radial slits extending toward the rim of the disk and toward the center of the disk. One or more of the slits can be configured to pass x-ray radiation from the collimated fan beam. The one or more slits can be tapered slits having greater width toward the rim of the disk than toward the center of the disk. Furthermore, the chopper wheel can include chamfering on at least two edges, or on all edges, of the one or more slits. The one or more slits can be tapered and also include chamfering on edges.

The x-ray source can be further configured to produce the collimated fan beam of incident x-ray radiation with end point x-ray energies in a range between about 50 keV and 500 keV. Furthermore, the endpoint x-ray energies can be in a range between about 200 keV and 250 keV.

The system can also include one or more backscatter detectors configured to detect x-ray radiation backscattered by objects irradiated by the incident radiation having passed through the chopper wheel. The one or more backscatter detectors can be mounted to an external surface of a vehicle.

In another embodiment, a method and corresponding system for x-ray scanning includes producing a collimated fan beam of incident x-ray radiation. The method also includes effecting rotation of a chopper wheel that is configured to be irradiated by the collimated fan beam. The rotation of the chopper wheel is effected in a rotation wheel plane that is substantially non-perpendicular relative to a beam plane containing the collimated fan beam of incident radiation.

Effecting rotation of the chopper wheel can include causing the rotation with an angle between the wheel plane and the beam plane being less than 30°. Furthermore, in certain embodiments, this angle can be less than 15°.

Effecting rotation of the chopper wheel, which results in effecting scanning of an x-ray beam incident at a scanning target, can further include using a disk chopper wheel with a rim, a center, and one or more radial slits extending toward the rim of the disk and toward the center of the disk. The one or more slits can be configured to pass x-ray radiation from the collimated beam. The rotation can be effected using the disk chopper wheel with one or more tapered slits having greater width toward the rim of the disk than toward the center of the disk. Effecting rotation of the chopper wheel can include using the disk chopper wheel with chamfering on at least two edges or on all edges of the one or more slits. Chopper wheels can include slits that are tapered and can also include chamfering on edges of the slits.

Producing the collimated fan beam can include producing x-rays with endpoint energies between about 50 keV and 500 keV. Furthermore, the end point energies can be between about 200 keV and about 250 keV.

The method can also include detecting x-ray radiation backscattered by objects irradiated by the incident radiation having passed through the chopper wheel. Detecting the backscatter x-ray radiation can include using one or more backscatter x-ray detectors mounted to an external surface of the vehicle that houses the chopper wheel.

In yet another embodiment, an x-ray scanning system includes an x-ray source configured to produce a collimated fan beam of incident x-ray radiation. The system also includes one or more backscatter detectors mounted to an exterior surface of a vehicle. The one or more backscatter detectors can be fixedly mounted to the exterior surface of the vehicle, and the detectors can be wavelength-shifting fiber (WSF) detectors.

The system can also include a chopper wheel that is configured to be irradiated by the collimated fan beam. The chopper wheel can be oriented with a wheel plane containing the chopper wheel substantially non-perpendicular relative to a beam plane containing the collimated fan beam of incident x-ray radiation. The chopper wheel can be oriented with a plane containing the chopper wheel (i.e., "wheel plane") substantially perpendicular relative to a plane containing the collimated fan beam of incident radiation (i.e., "beam plane").

In still a further embodiment, an x-ray scanning system includes an x-ray source configured to produce a collimated fan beam of incident x-ray radiation. The system also includes a disk chopper wheel that is configured to be irradiated by the collimated fan beam. The disk chopper wheel is oriented with a wheel plane containing the disk chopper wheel that is substantially perpendicular relative to a beam plane containing the collimated fan beam of incident radiation. The disk chopper wheel includes one or more tapered radial slits extending toward a rim of the desk and towards a center of the disk, with the one or more tapered slits having greater width toward the rim of the disk than toward the center of the disk and being configured to pass x-ray radiation from the collimated fan beam.

Advantages of certain embodiments include extending the applicability of the scanning chopper wheel disk to significantly higher x-ray energies. With much higher x-ray energies, significantly thicker targets can be imaged. Various embodiments can substantially reduce the weight of chopper disk BX inspection systems operating in the 200 keV to 500 keV range. Furthermore, the cost of chopper disk BX inspection systems that operate in the 200 keV to 500 keV range can be significantly reduced.

Furthermore, some embodiment systems can include detectors with a thin enough profile that they can be mounted directly onto the exterior of the vehicle enclosure, without modification to the enclosure.

BRIEF DESCRIPTION

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 is a table showing the effective thickness of tungsten needed to provide a factor of $10^8$ attenuation of an incident x-ray beam.

DETAILED DESCRIPTION

A description of example embodiments of the invention follows.

Rotating disks were used in the earliest x-ray imaging systems designed in 1972. Initially, the rotating disk was used to create a digital transmission x-ray imaging system. Backscatter imaging was eventually added by incorporating additional scatter detectors in the back direction. Backscatter imaging using chopper disks has been used since the 1980's to create scanning beams of x-rays with end-point energies in the 120 keV to 160 keV range. The method has not been practical at much higher energies because the needed thickness (and therefore weight) of the rotating disk increase rapidly with energy.

Disclosed herein are embodiment x-ray scanning systems that can be extended to operate at much higher x-ray energies of at least 500 keV while controlling thickness and weight of chopper disks.

Figure 1:
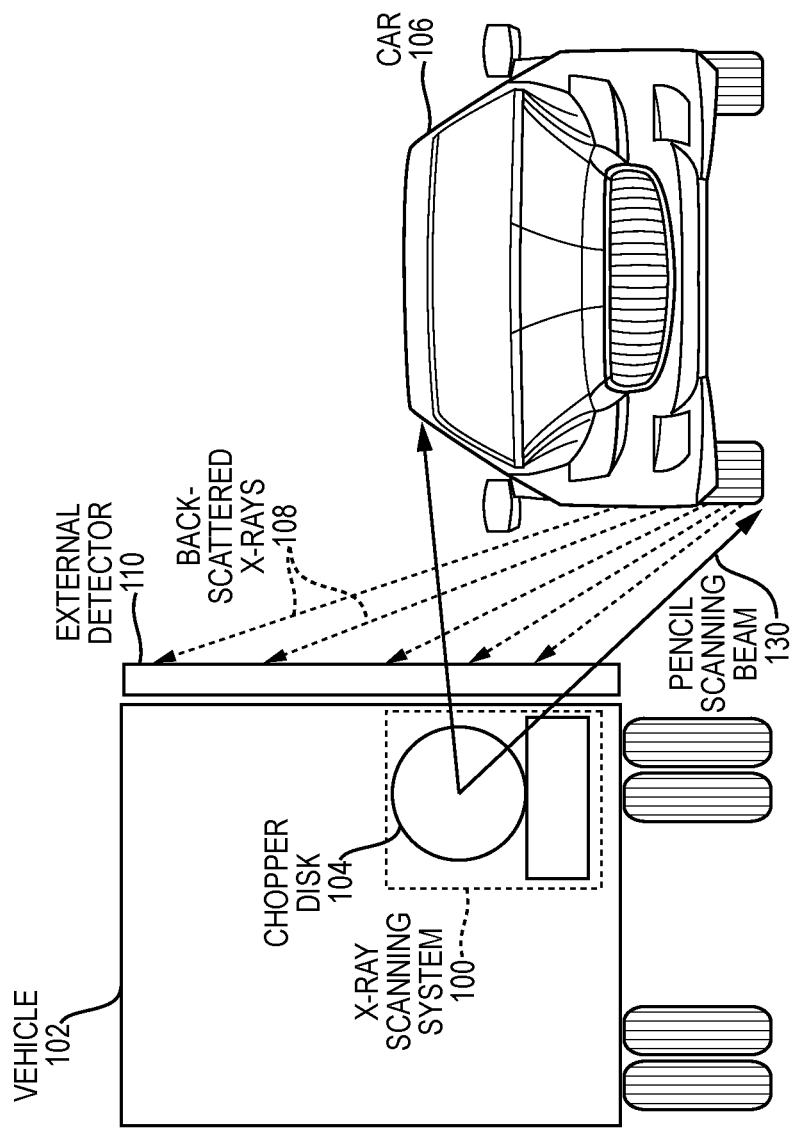
FIG. 1 is a schematic diagram illustrating an embodiment x-ray scanning system mounted within a vehicle.

FIG. 1 is a schematic diagram illustrating an embodiment x-ray scanning system 100 mounted within a vehicle 102. The system 100 includes a chopper disk 104, as well as an x-ray source (not shown in FIG. 1), both of which are illustrated further in figures described hereinafter. The chopper disk 104 is a chopper wheel that is substantially disk-shaped, as further illustrated in FIG. 2. Alternatively, in other embodiments, a chopper wheel need not be perfectly circular or completely disk-shaped, so long as it can be rotated to scan an x-ray beam, as further described hereinafter.

A scanning pencil beam 130 of x-rays is swept from the system 100 over the car 106 to scan the car for contraband. Backscattered x-rays 108 are scattered from the car, and an external detector 110 is mounted externally on the vehicle 102 and detects the scattered x-rays 108. The external detector 110 is mounted in a fixed manner to the vehicle, such that detector folding or removal or other reconfiguration is not necessary when the vehicle is driven. The external detector 110 is described further hereinafter in the description of FIG. 11.

Figure 2:
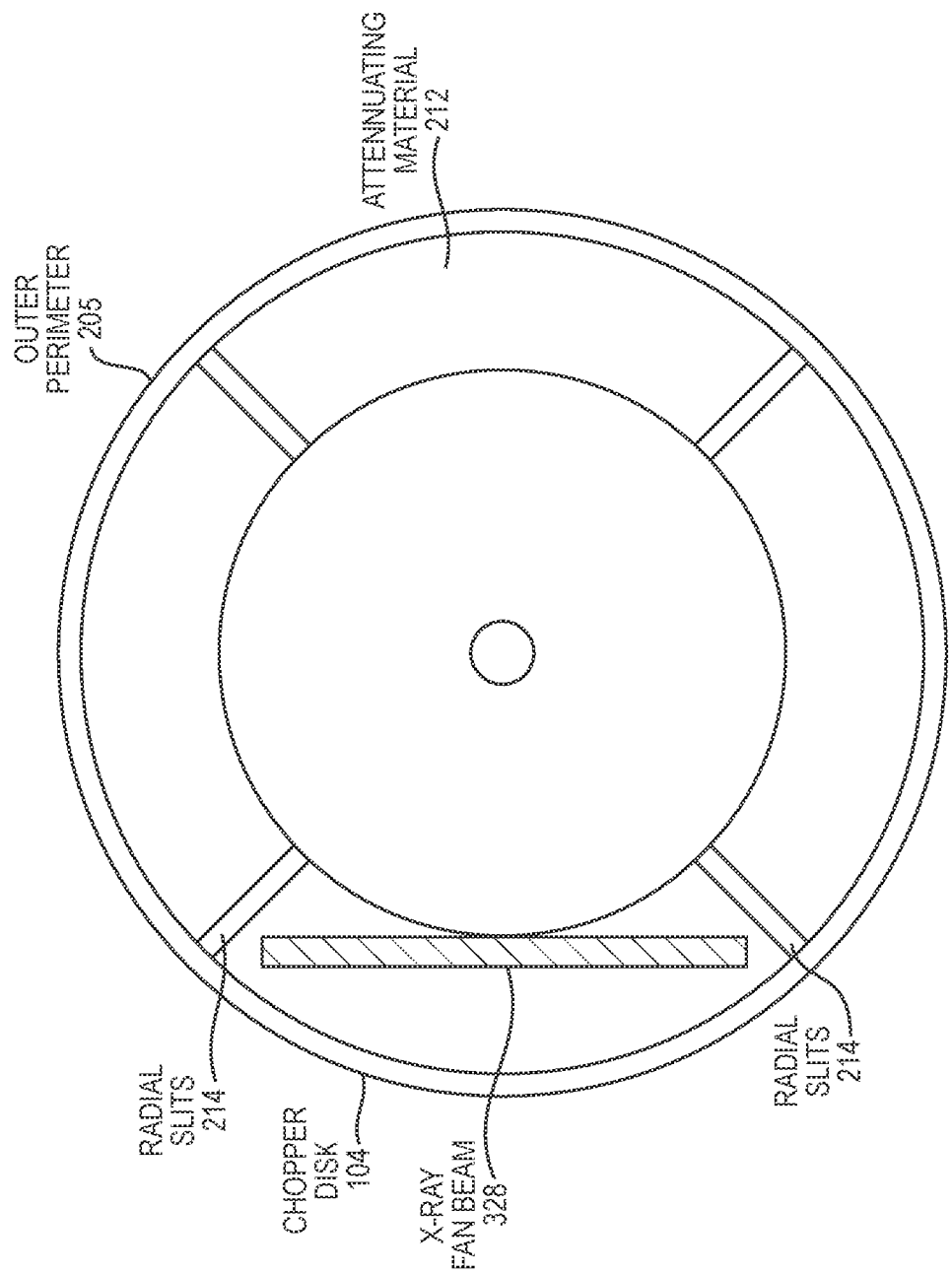
FIG. 2 is a more detailed illustration of the chopper disk in the scanning system shown in FIG. 1.

FIG. 2 is a front view that further illustrates the chopper disk 104 of FIG. 1 in greater detail. The embodiment chopper disk 104 includes a band of attenuating material 212, which can be lead or tungsten, for example. Alternatively, other attenuating materials can also be used. The attenuating material of the chopper disk includes a series of radial slits 214 therethrough that allow x-rays to pass through the slits. A cross section of a fan beam 328 of x-rays is illustrated intersecting with the disk 104. The radial slit 214 is configured to pass x-ray radiation of the collimated fan beam 328, as further illustrated in FIG. 3. In particular, the intersection of the fan beam 328 with a radial slit 214 as the disk is rotated allows a pencil beam 130 of x-rays (illustrated in FIGS. 1 and 3) to pass through the disk 104.

The pencil beam is illustrated, in FIG. 1, as pencil scanning beam 130, and also in other figures described hereinafter. As the disk rotates, the pencil beam of x-rays scans within the plane of the incident fan beam, with the scan direction defined by the line of sight from the x-ray source focal spot through the illuminated slit 214. If the fan beam is vertical, then the beam scans up and down as the disk rotates. Alternatively, if the fan beam is horizontal, for example, the beam scans from side to side as the disk rotates.

The material making up the bulk of the chopper disk can be constructed of aluminum, for example. Aluminum is advantageous because it is lighter than lead or tungsten. Since the fan beam 218 only intersects with attenuating material 212, the material making up the bulk of the disk need not be as opaque toward x-rays as lead or tungsten are for the attenuating material 212, for example. Alternatively, other materials besides aluminum can be used for the outer perimeter. Furthermore, a solid tungsten disk with slits machined into it can also be used in other embodiments.

In the embodiment of FIG. 2, four radial slits 214 in the lead disk with slit edges defined by tungsten "jaws" create four sweeping pencil beams per rotation of the disk 104. However, in other embodiments, different numbers of radial slits can be used, and the slits can be oriented such that the fan beam intersects with only one slit at a time as the disk rotates.

Figure 3:
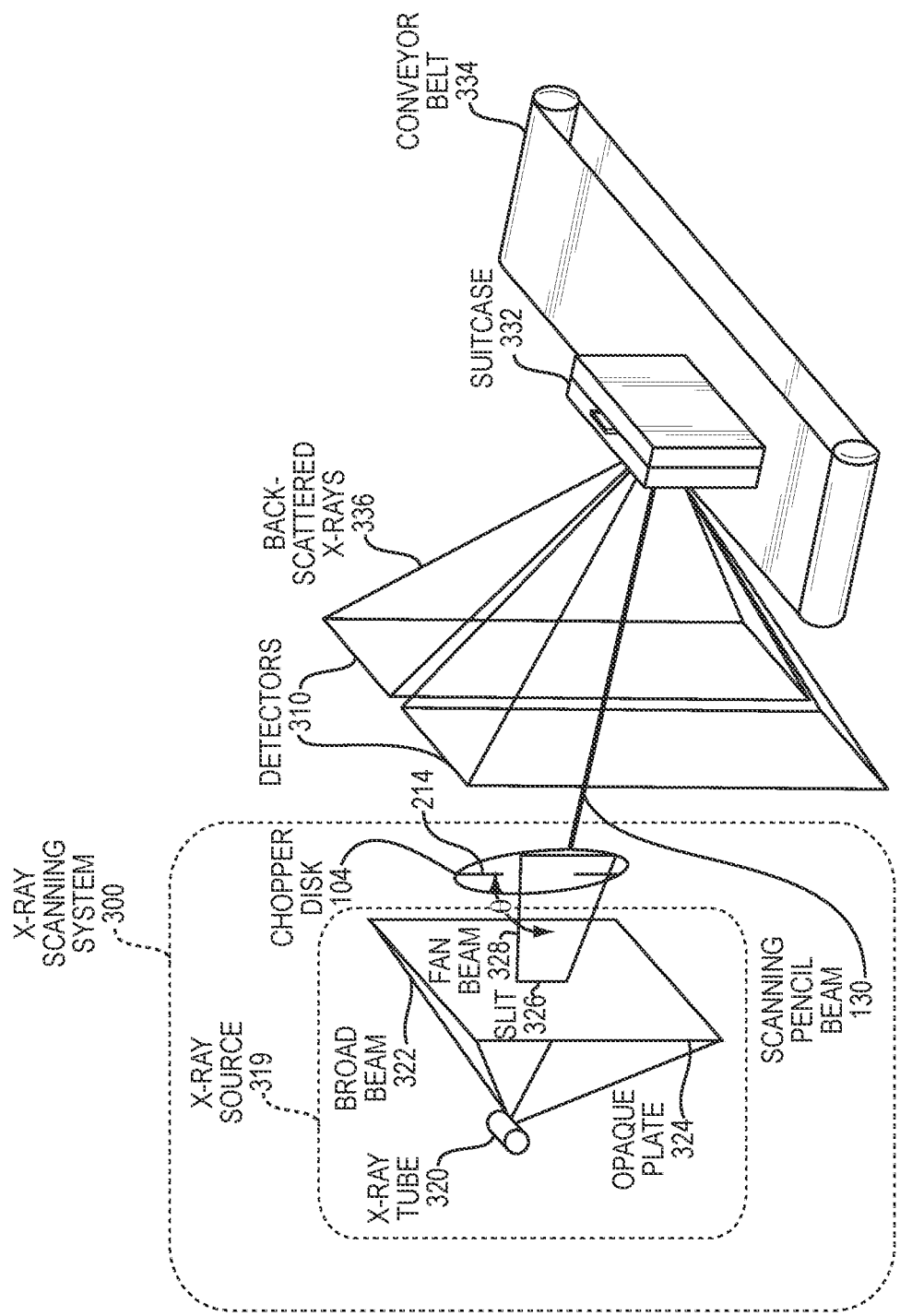
FIG. 3 is an illustration of an embodiment x-ray scanning system with a substantially non-perpendicular angle between the chopper disk and x-ray fan beam.

FIG. 3 illustrates how the chopper disk 104 can be used in an embodiment x-ray scanning system 300. An x-ray tube 320 generates a broad beam 322 of x-rays. The broad beam 322 irradiates an opaque plate 324 that is opaque to x-rays and has a plate slit 326. The opaque plate 324 with the plate slit creates an x-ray fan beam 328. The x-ray tube 320 and opaque plate 324 form an x-ray source 319 that is configured to produce the collimated fan beam 328 of incident x-ray radiation that is incident on the chopper disk 104. In other words, the chopper wheel, or disk in the embodiment of FIG. 3, is configured to be irradiated by the collimated fan beam of incident x-ray radiation. In some embodiments, the x-ray source is configured to produce the collimated fan beam of incident x-ray radiation with end-point energies in a range of between about 50 keV and about 500 keV, or between about 200 keV and about 250 keV, for example. The x-ray source 319 and chopper disk 104 form a system 300 that can be used for x-ray scanning.

The fan beam 328 intersects the chopper disk 104, which is oriented in a disk plane that is substantially non-perpendicular with respect to a beam plane in which the fan beam 328 is oriented. In other words, the chopper disk is oriented with the disk plane that is substantially non-perpendicular, at an angle Θ, relative to the beam plane containing the collimated fan beam of incident radiation. In some embodiments, the angle Θ is less than 30°, for example. In other embodiments, the angle Θ is greater or less than this range, such as less than 15°, for example. This orientation is further illustrated in FIG. 4.

Continuing to refer to FIG. 3, when one of the equally-spaced radial slots is in the fan beam, a scanning pencil beam 130 is created. As the disk 104 rotates, the radial slits 214 chop the fan beam 328 into the scanning pencil beam 130.

Referring again to FIG. 3, the scanning beam 130 is scattered from a suitcase 332 on a conveyor belt 334. The target suitcase 332 causes backscattered x-rays 336 to be scattered toward backscatter detectors 310. The detectors 310 record intensity of scattered x-rays 336 as a function of the beam position on the target suitcase. As the target suitcase moves through the plane of the scanning pencil beam 130 on the belt 334, a two-dimensional backscatter image of the suitcase target is obtained. Other targets can include cars, as illustrated in FIG. 1, or any other object or material. As further described hereinafter, the non-perpendicular angle between the chopper disk and the fan beam allows the chopper disk to attenuate higher energy x-rays with substantially lower disk weight and cost.

Figure 4:
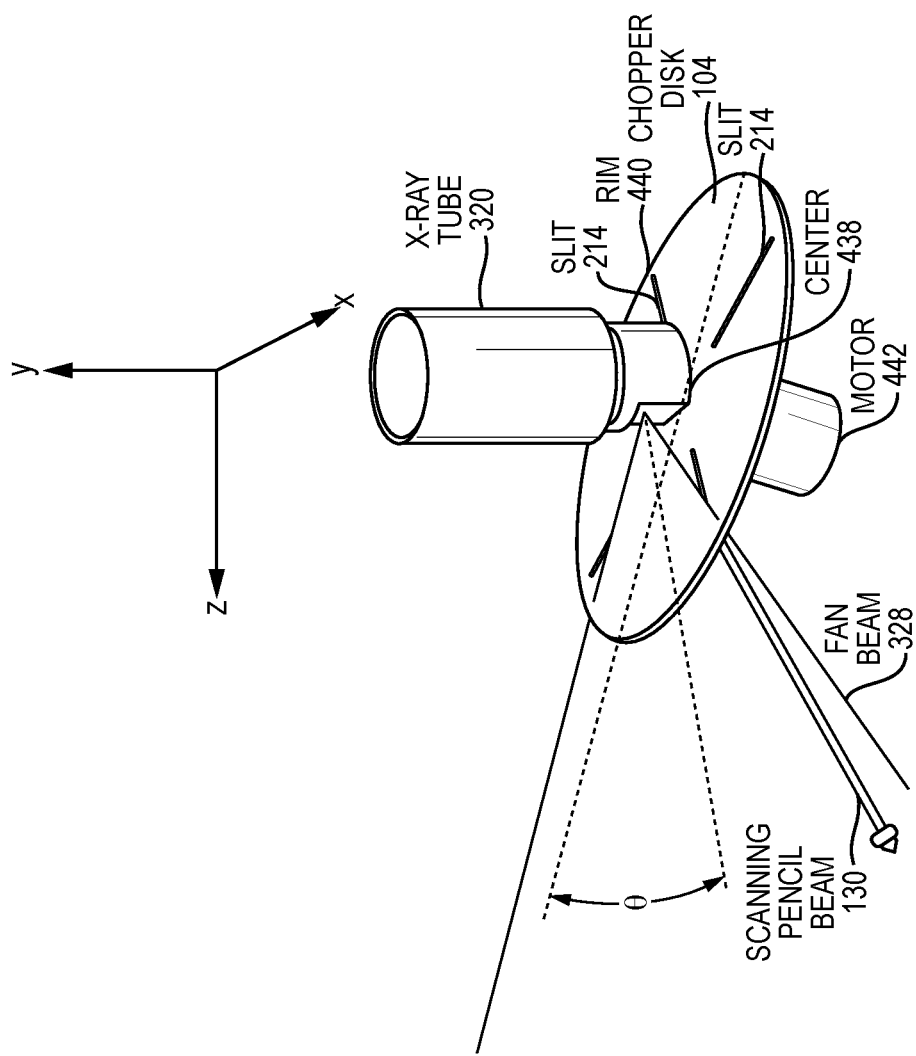
FIG. 4 is a more detailed illustration showing the orientation of the chopper disk in FIG. 3 with respect to the incident fan beam.

FIG. 4 illustrates the orientation of the fan beam 328 and chopper disk 104 in greater detail. The x-ray tube 320 is oriented with an axis in the Y direction. The fan beam 328 is oriented in the X-Z plane (the X-Z plane contains the fan beam 328). The plane of rotation of the chopper disk lies at an oblique non-perpendicular angle Θ to the X-Z plane. The scanning pencil beam 130 also is scanned in the X-Z plane, i.e., the beam plane, as the chopper disk rotates. The chopper disk 104 includes a rim 440 and center 438, and the slits 214 are oriented to extend radially toward the rim and center. The chopper disk 104 is rotated by means of a motor 442.

The chopper disk 104 is not oriented in either the X-Z plane or the X-Y plane, but, rather, in a disk plane that is at an angle Θ with respect to the beam plane (X-Z plane) of the fan beam 328. The disk plane can also be referred to as a plane of rotation (or rotational plane) of the chopper disk 104, because the disk remains parallel to this plane as it rotates. The disk plane can be parallel to the X axis. By positioning the plane of the rotating disk at an acute (substantially non-perpendicular) angle Θ to the plane of the fan beam, the actual thickness of the disk can be reduced by a factor $F=1/\sin(\Theta)$ while keeping the disk's effective thickness the same. As used herein, "substantially non-perpendicular" indicates that the angle Θ is small enough to increase effective thickness significantly, such as increasing effective thickness by more than 25%, more than 50%, more than 100% (an effective thickness multiplier of 2), more than 200%, or more than 400%.

Figure 5:
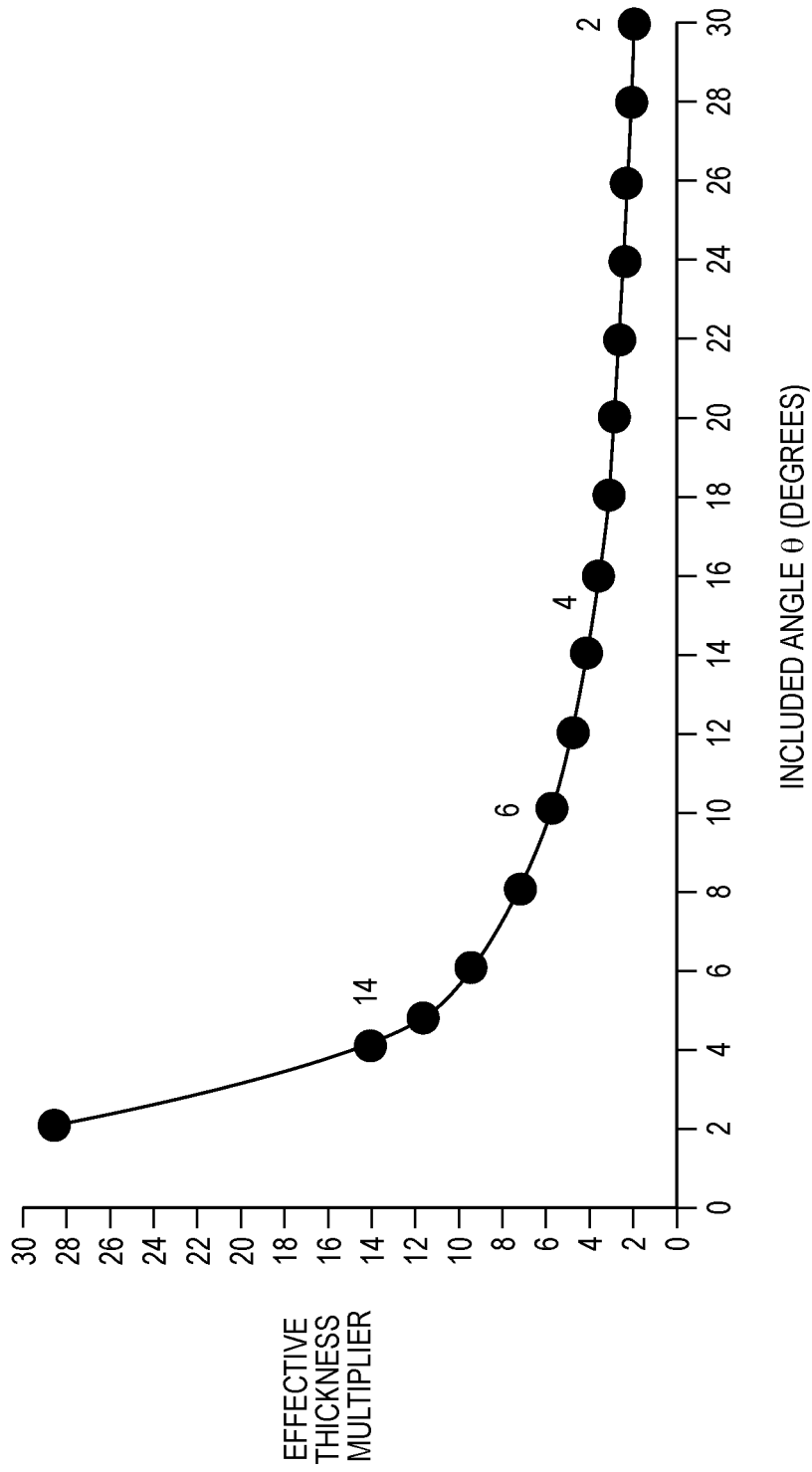
FIG. 5 is a graph showing an effective thickness multiplier as a function of angle Θ between a chopper disk and incident x-ray fan beam.

FIG. 5 is a graph showing an effective thickness multiplier plotted as a function of Θ. For example, with the included angle reduced from 90° to 15°, the effective thickness has increased by an effective thickness multiplier factor of 4. A 3 mm thick tungsten disk then has the radiational stopping power of a 12 mm disk.

FIG. 6 is a table showing the effective thickness of tungsten needed to provide a factor of $10^8$ attenuation of an incident x-ray beam. As shown in the table, the end-point x-ray energy of a scanning system with a 3 mm thick disk is increased from 120 keV to about 240 keV. As a further example, a very highly penetrating 400 keV end-point energy scanning pencil beam can be created by using a 5.5 mm thick disk at an included angle Θ of 10°.

Figure 7:
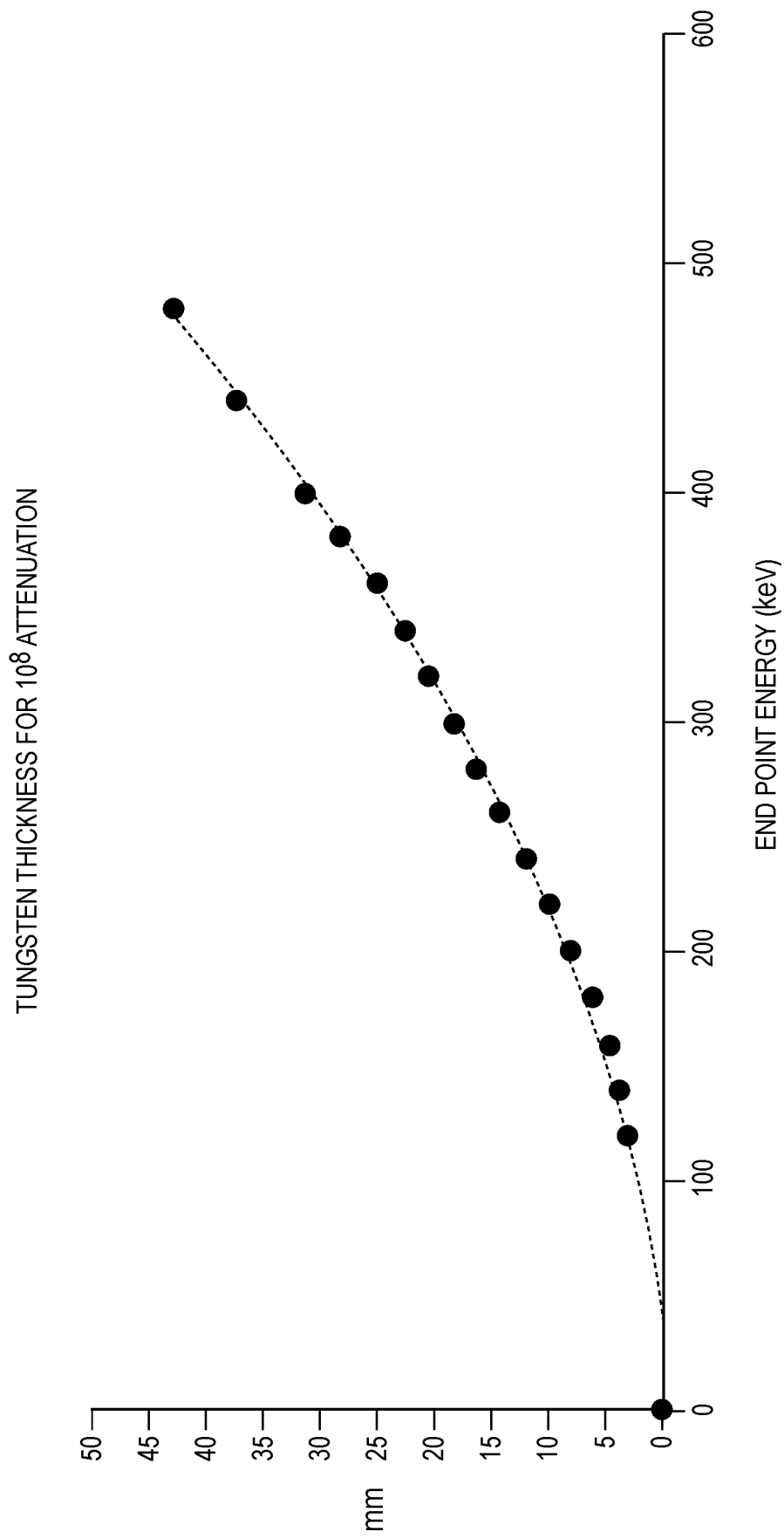
FIG. 7 is a graph showing the tungsten thicknesses listed in the table of FIG. 6.

FIG. 7 is a graph showing the tungsten thicknesses and x-ray end point energies listed in the table of FIG. 6.

Weight reduction is useful for hand-held x-ray imaging devices also, but it is also a factor for all uses of the rotating disk x-ray scanning method. This is because weight reduction is accompanied by cost reduction, not only of the disk itself but also the ancillary equipment, such as a driving motor and support bearings. A dramatic reduction in weight can be achieved with a disk with a grazing angle of incidence. For practical applications requiring disks with radii in the 25 cm range, the weight reduction can be more than 50 pounds, and the cost of goods can be lowered by thousands of dollars. For example, for a 225 keV x-ray system with an 18" diameter disk, the weight reduction would be 23.7 kg (52 lbs) compared with an existing perpendicular illumination disk.

In addition to saving weight, the materials cost savings are also substantial. For the hand-held system, the savings from the reduced tungsten material would be approximately $40 USD at today's values. For the 18" disk in the 225 keV system, however, the savings from the reduced amount of tungsten can be close to $3,000 USD at today's values. In addition to a smaller, lighter chopper disk, a smaller motor can also be used to spin the disk, due its greatly reduced moment of inertia. Alternatively, the same motor can be used with a greatly reduced spin-up time to reach the 1,800-2,500 rpm rotation speed typically used in backscatter imaging systems. Another advantage of the reduced moment of inertia of the disk is a large reduction in gyroscopic effects, which can cause unwanted torques on the system when the system is moved.

Thus, substantially non-perpendicular chopper disks can facilitate x-ray scanning with end-point x-ray energies in a range above 500 keV. Furthermore, x-ray scanning with energies in a range of between about 50 keV and about 500 keV can be facilitated. For example, x-ray scanning with energies in a range of between about 200 keV and about 250 keV can be facilitated. As used herein in reference to x-ray energy, "about" indicates an energy tolerance of ±10%.

In order to allow the x-rays to pass through the slits of the chopper disk with an acute included angle, the two ends of the slit can be heavily chamfered.

Figure 8:
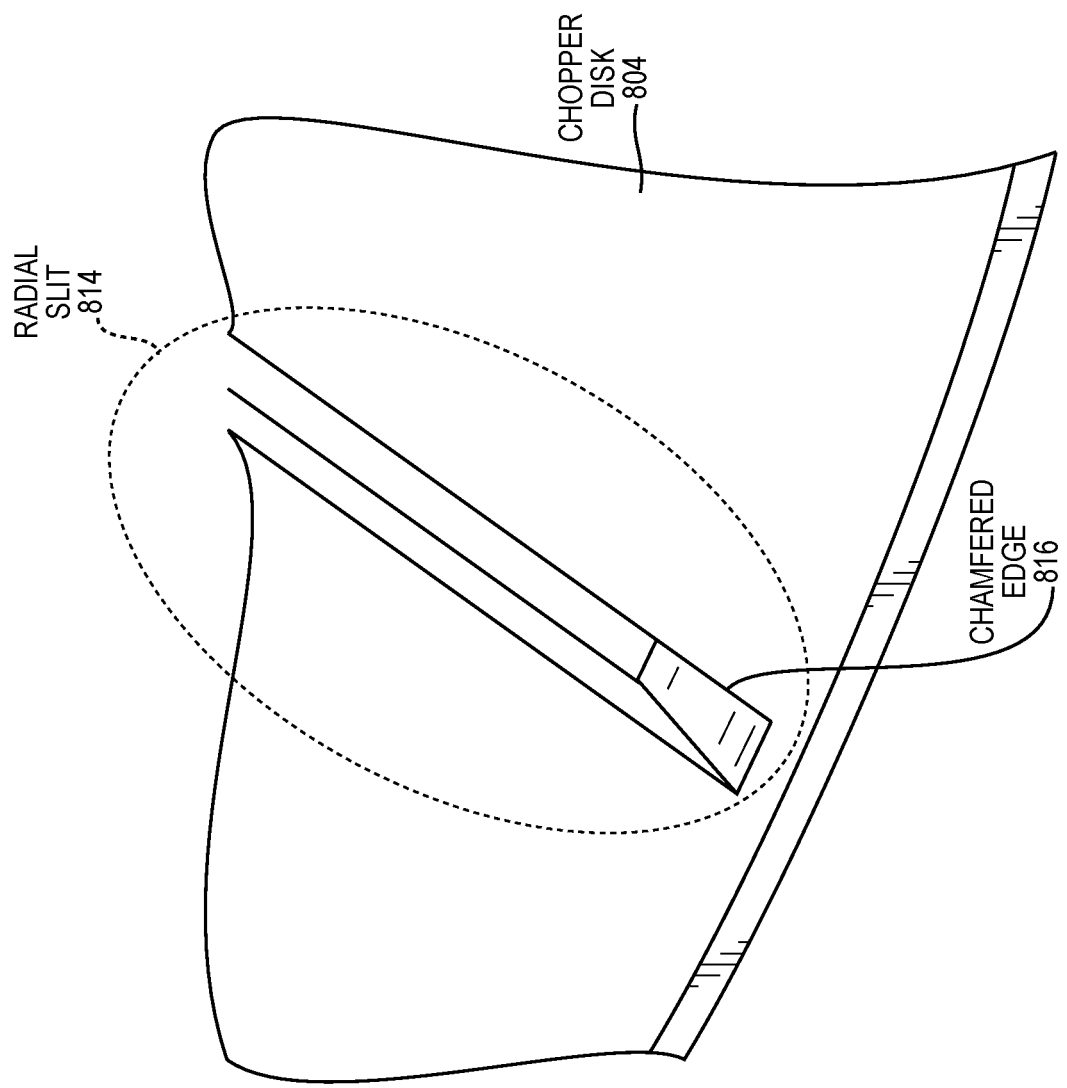
FIG. 8 illustrates a chopper disk with a chamfered slit edge.

FIG. 8 illustrates a chopper disk 804 with a radial slit 814 that has a chamfered edge 816 at the end of the slit. The edge 816 extends toward the rim of the disk. While not shown in FIG. 8, the other end of the slit, which extends toward the center of the disk 804, can also be chamfered similarly. Furthermore, the longer edges of the slit can also be chamfered, in order to allow the beam to pass cleanly through the slit as the disk rotates, at all intersection points of the slit with the incident fan beam. Thus, all edges of the slits, including four edges, can be chamfered. While slits need not be chamfered in all embodiments, chamfering is useful, especially when included angles between the fan beam and chopper wheel are smaller, and fan beam x-rays would otherwise be attenuated by passing through an edge of a plate.

Figure 9:
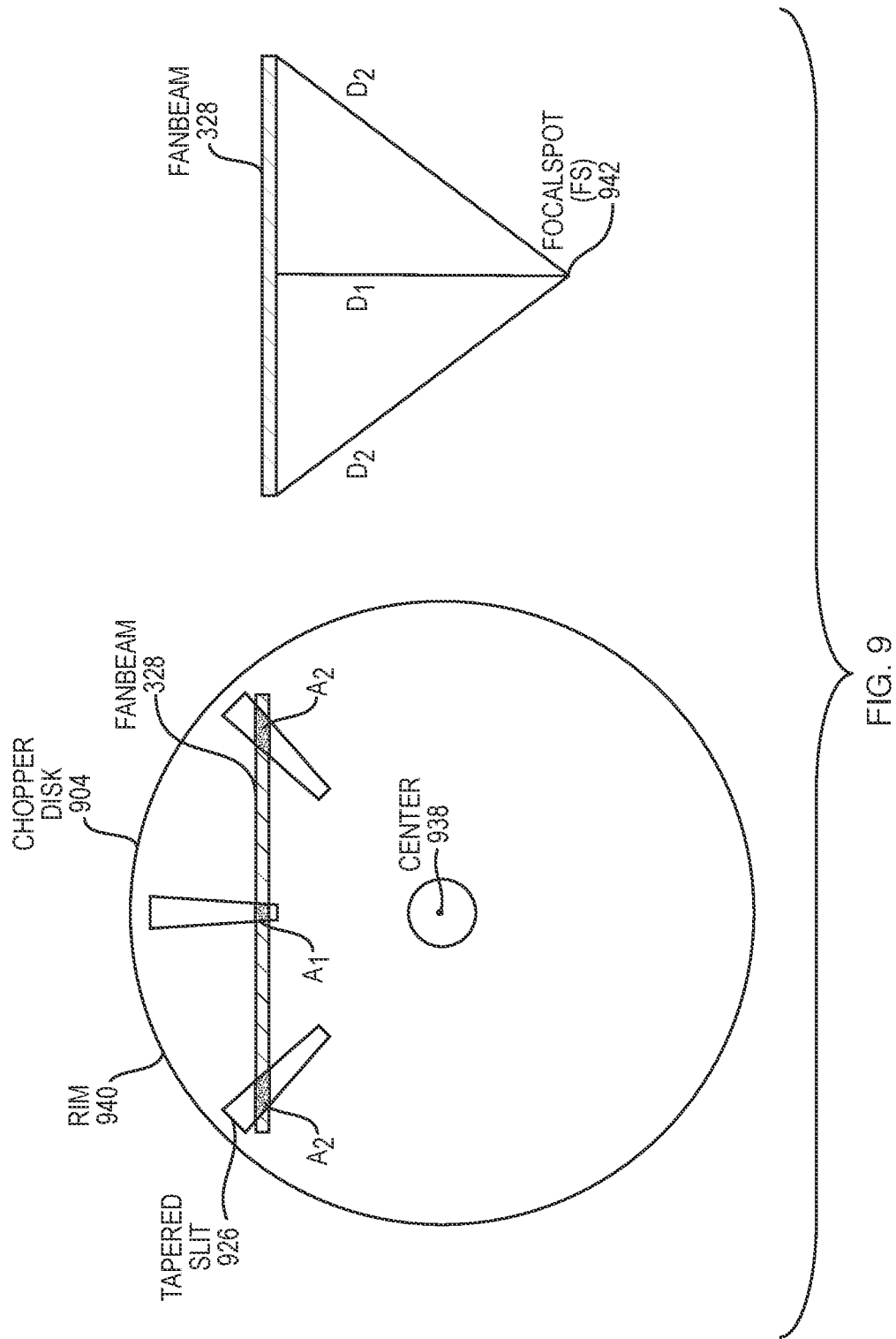
FIG. 9 illustrates a chopper disk with tapered slits.

FIG. 9 illustrates another aspect of embodiments disclosed herein, namely tapering of the radial slits to maintain a constant beam intensity as the beam sweeps through the slit. Tapering refers to the variable width of slits. In FIG. 9, a chopper disk 904 includes slits 926 that are tapered, with the width of the slits increasing from the center 938 of the disk toward the rim 940 of the disk. In other words, the slits 926 have greater width toward the rim of the disk than toward the center of the disk. The tapering of the slits is designed so that the solid angle of the slits, as viewed from a focal spot 942 of the x-ray tube, remains approximately constant through the scan. A first order equation describing this condition is Equation (1):

$$\frac{A_1}{D_1^2} = \frac{A_2}{D_2^2}$$

where $A_1$ and $A_2$ are the areas of the region where the slit 926 overlaps with the incident illuminating fan beam 328 when the slit is at the center and end of the scan, respectively, and $D_1$ and $D_2$ are the respective distances between the x-ray source focal spot (FS) and the centers of the overlap areas $A_1$ and $A_2$, when the slit is at the center and end of the scan, respectively. The advantage of the tapering is emphasized by considering a reduction in beam intensity at the extremes if the slits are not tapered. The ratio of beam intensity when the untapered slit is at the center of the fan beam to the intensity when at the end is shown in Equation (2):

$$\frac{I_2}{I_1} = \frac{D_2^2}{D_1^2}$$

For an 18" diameter disk 12" away from the focal spot, for example, the intensity $I_2$ at the extremes will only be about 64% of the intensity $I_1$ at the center of the scan. This causes issues with the backscatter imaging, as the images appear darker and noisier at the extremes of the scan. By using tapered disks with the slit tapering designed specifically so that $A_1$ and $A_2$ satisfy Equation (1), the intensities $I_1$ and $I_2$ can be made to be equal, and the image brightness and noise characteristics are more uniform across the scan.

Figure 10:
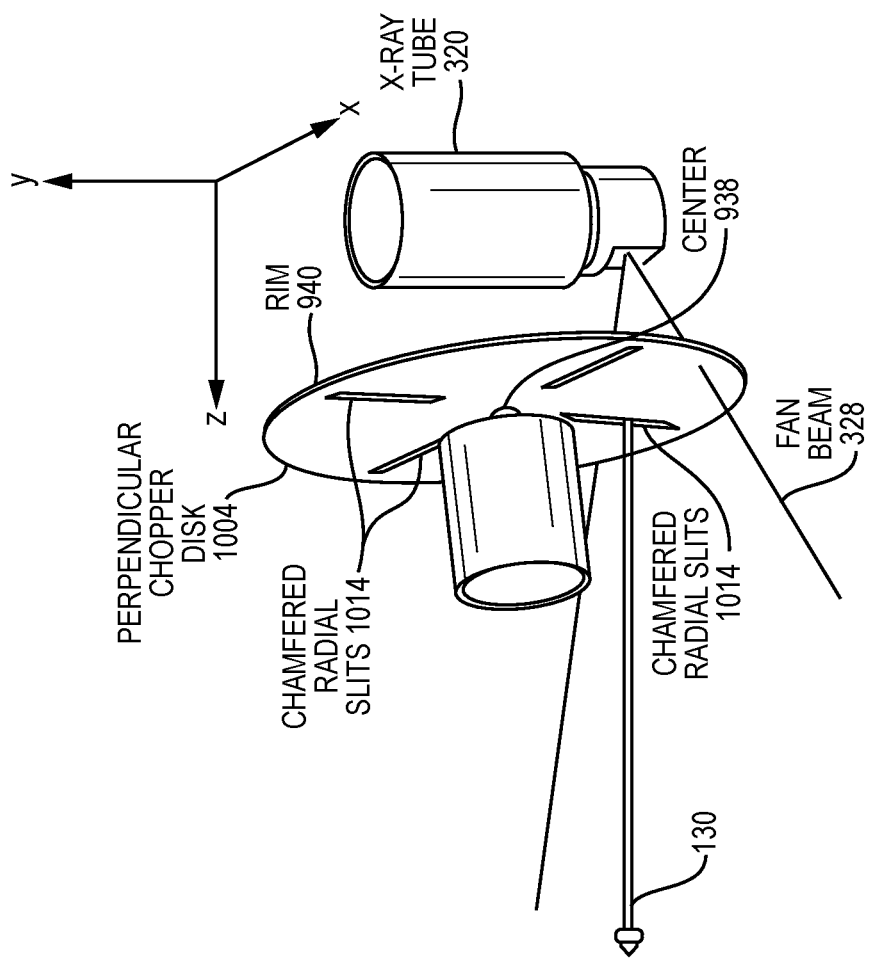
FIG. 10 illustrates a chopper disk, oriented substantially perpendicular to an x-ray fan beam, that can include tapered slits or chamfered slits or be used in an embodiment system that includes backscatter detectors mounted externally on a vehicle.

FIG. 10 illustrates how some embodiments disclosed herein can use chopper disks oriented substantially perpendicular to x-ray fan beams. As used herein, "substantially perpendicular" indicates perpendicular to within a range in which effective thickness of a chopper disk is not increased significantly, such as not more than 25%, not more than 10%, or not more than 5%. In FIG. 10, the fan beam 328 is oriented in the X-Z plane, while a chopper disk 1004 is situated, and undergoes rotation, in a disk plane that coincides with (or is parallel to) the X-Y plane. Radial slits 1014 are chamfered along the long edges, as described in conjunction with FIG. 10. In other embodiments, the perpendicular orientation illustrated in FIG. 10 can be used for chopper disks having tapered slits, for example. In yet other embodiments, the perpendicular orientation may be used in a mobile x-ray scanning system with external detectors, as illustrated in FIG. 1, for example.

External Detectors

X-ray backscatter imaging was first implemented on a mobile platform in the early 1990's. The first system operated at 450 keV. Systems of that time period were fitted with an extendable boom, which when deployed, provided either a beam stop for intercepting the radiation on the far side of the object being imaged, or a transmission detector, so that the system could provide both backscatter and transmission x-ray images.

Furthermore, some systems included a large internal chopper wheel to create the 450 keV "flying spot" pencil beam of x-rays to scan up and down as the system is slowly driven past the object being scanned. The backscatter detectors on some mobile systems consisted of hollow boxes lined with scintillator screen, and viewed with Photo-Multiplier Tubes (PMTs), which detect the light emitted from the scintillator when an x-ray gets absorbed. Eight of these detector boxes, for example, were positioned in an external cabinet built into the mobile scanner truck housing. It should be noted that these truck enclosures had to be heavily modified in order to house the backscatter detectors, which are about 14" wide, 12" deep, and 60" high. In the original design, the upper detector boxes could be hydraulically lowered so that the detection efficiency of the backscattered x-rays is increased when smaller vehicles are scanned. In later designs, the detectors were not deployable, and all eight detector boxes remained fixed permanently in the vertical, stowed position.

In almost all the existing backscatter systems, the backscatter detectors are of a similar standard design. These consist of hollow plastic or aluminum boxes lined with scintillator screen, such as gadolinium-oxy sulfide (GdOS) or barium fluoro-chloride (BaFCl2) with a front face transparent to x-rays to let the radiation through. Photo-multiplier tubes, typically located at the rear of the boxes, are used to detect the scintillation light emitted from the absorbed x-rays. Because of the optical details involved with the light collection in these detectors, the detector boxes need to have an aspect ratio in which the depth of the box cannot be much smaller than half the width of the box. Because the PMTs also typically protrude from the rear of the boxes, this means that the detectors must either be recessed in a special cabinet built into the side of the vehicle enclosure, which requires extensive modifications to be made, or the detectors need to be concealed completely within the vehicle enclosure.

Both approaches require that any overlying material be sufficiently transparent to the backscattered x-rays so that the x-rays can be detected by the detector boxes. Because the energy of the backscattered x-rays is substantially lower than the x-rays in the incident beam due to the physics of the Compton Scatter process, this overlying material must have a relatively low atomic number, and is typically chosen to be plastic, thin aluminum (approximately 0.25-1.0 mm thick) or some kind of composite carbon-based material. Since the material typically found in the sides of vans and truck enclosures is steel, the steel must be removed and replaced with more transparent material if the detectors are concealed within the vehicle enclosure. This extensive modification is costly, and also means that thermal insulation must be removed from the enclosure sides in the region where the detectors are positioned. The material in the regions where the steel in the vehicle enclosure is removed has been called the "scan panel."

Around the year 2004, backscatter systems operating at a lower end-point energy of 225 keV were introduced. These systems had the detectors contained completely inside the vehicle enclosure. Earlier systems had custom-made compartments mounted on the side of the vehicle chassis, with the backscatter detectors concealed inside. The material in front of the detectors was thin aluminum. In more recent systems, steel is removed from the side of the original vehicle enclosure and replaced with a low atomic number composite "scan panel," as described previously. In both cases, the detectors are concealed within the vehicle enclosure due to their approximately 12" depth.

As described previously, prior-art box-type backscatter detectors are bulky and cannot therefore be easily mounted to the exterior of a vehicle for mobile imaging systems, particularly if the system needs to be used covertly. They therefore need to be concealed within the vehicle enclosure or to be stored in an external recessed cabinet, as in prior-art systems. Both of these options require extensive modifications to the vehicle enclosure as described above.

Figure 11:
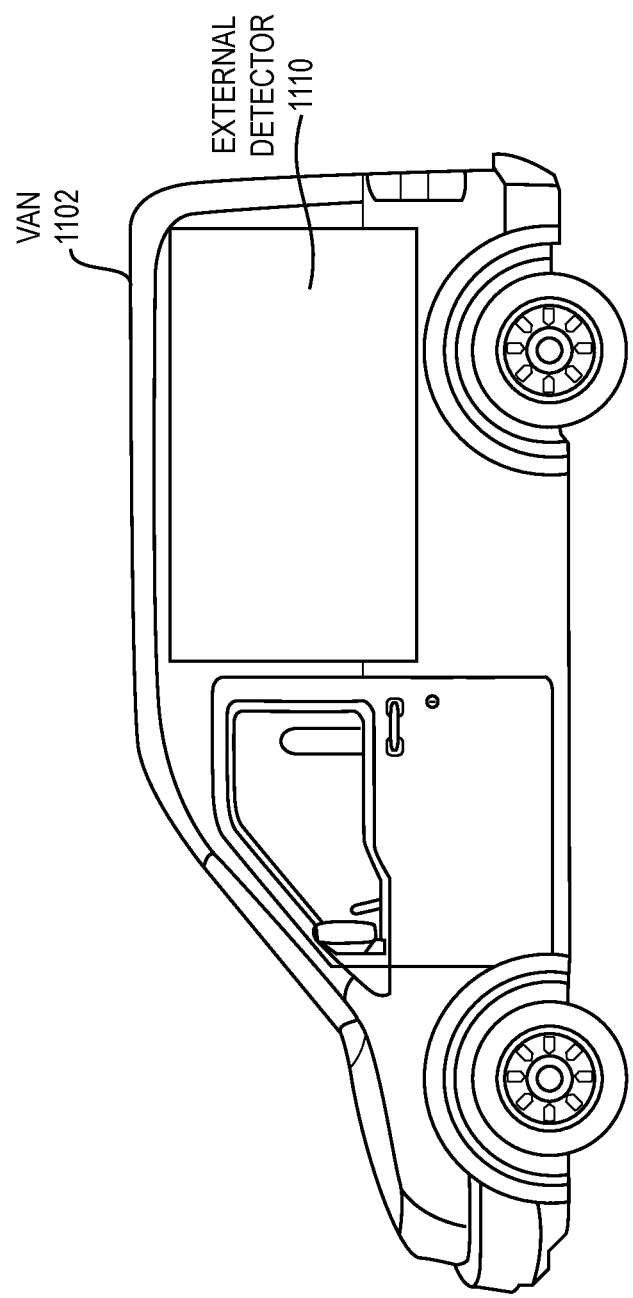
FIG. 11 illustrates a low-profile backscatter detector mounted externally on a van.
Figure 12:
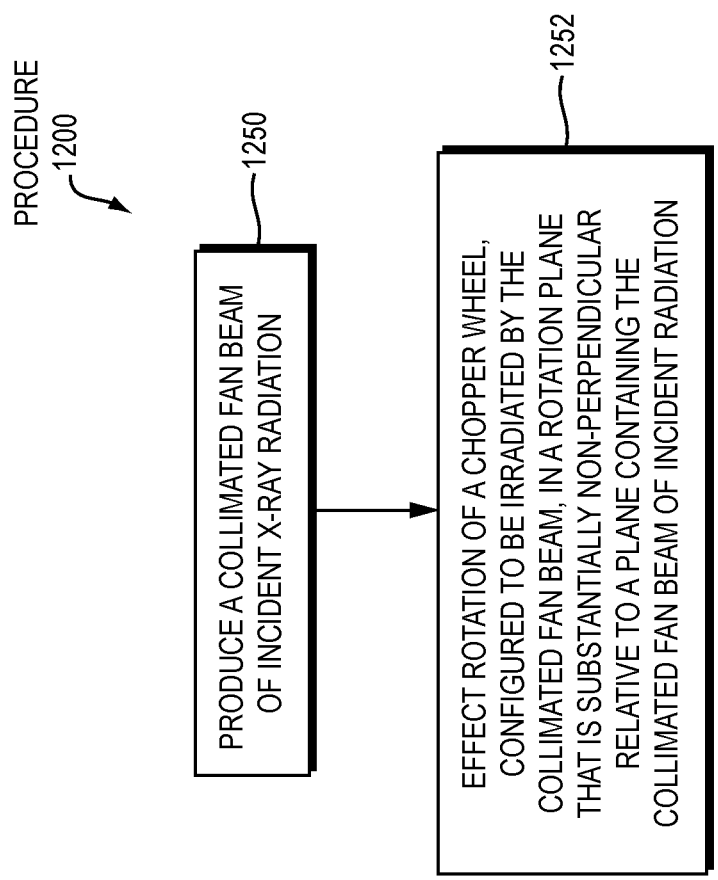
FIG. 12 is a flow diagram illustrating an embodiment method of x-ray scanning.

FIG. 11, in contrast to existing systems, illustrates a mobile x-ray scanning van 1102 with an external detector 1110 mounted on a side of the van. FIG. 11 illustrates how some embodiments disclosed herein are x-ray scanning systems that are mobile and employ detectors mounted externally to a vehicle housing the scanner. A scanner such as that illustrated in FIG. 1 or FIG. 3, for example, can be housed within the van 1102.

The detector 1110 has a thin enough profile that it can be mounted directly onto the exterior of the vehicle enclosure, without modification to the enclosure. The detector 1110 is "fixedly mounted," meaning that it is configured to remain mounted to the exterior of the van when the van 1102 is being driven. It need not be stowed during travel.

In some embodiments, the detector 1110 is less than 1 inch thick and can be based on wavelength-shifting fibers (WSF). As known in the art, one or more sheets of scintillating screen, such as GOS or BaFCl, can be interspersed with one more layers of WSF to extract the scintillation light. The fibers can be bundled, with one or more ends of the fiber bundle attached to a photodetector, such as a PMT or a solid state device such as a silicon PMT. The detector 1110 is used as the primary means of detecting backscattered x-rays from a target. Some embodiments can be designed to conform to the outer surface of the vehicle enclosure, allowing the system to remain essentially covert and not affect the visual aesthetics of the vehicle.

In some embodiments, a low-profile WSF backscatter detector has dual-energy capability. As known and practiced in the art, WSF detectors can be designed to have two separate readout channels: one more sensitive to lower energy x-rays and the other more sensitive to higher energy x-rays. Typically, the front channel is the low-energy channel and has scintillator optimized to absorb the lower energy range. The rear channel typically detects the higher energy x-rays that pass through the low-energy channel, and is optimized for higher detection efficiency at the higher x-ray energies. Quite often, an attenuating filter is placed between the two channels, such as a thin copper sheet, or similar. The ratio of the signals from the two channels can be used to characterize the energy spectrum of the backscattered x-rays. A spectrum with a relatively higher signal in the low energy channel compared with the high energy channel can signify scatter originating from low atomic number materials, such as organic objects. Conversely, a spectrum with a relatively lower signal in the low energy channel compared to the high energy channel can signify scatter from materials with higher atomic number, such as metallic objects.

To summarize, some advantages of the low-profile WSF detectors mounted directly onto the exterior enclosure of a mobile backscatter imaging platform as described in this disclosure include the following:

1. No expensive modification of the vehicle enclosure and no scan panel are required, substantially reducing overall system costs.
2. X-rays entering the detector do not have to pass through the enclosure material, which would otherwise attenuate the scattered x-rays, increasing the signal-to-noise ratio of the resulting backscatter images.
3. Because the detectors do not have to be mounted inside the enclosure behind a scan panel of low-attenuation material, the detector area is not as constrained and the detectors can be substantially larger, increasing the signal-to-noise ratio of the backscatter images.

4. Dual-energy capability can easily be added to WSF detectors, which is not the case with the standard, existing, box-type detectors. In addition, mounting the detectors outside the enclosure increases the sensitivity of the low-energy channel due to reduced attenuation of the low energy x-rays, enhancing the ability of the detectors to perform physical material discrimination.

FIG. $I_2$ is a flow diagram illustrating an embodiment method. At 1250, a collimated fan beam of incident x-ray radiation is produced. At 1252, rotation of a chopper wheel is effected, wherein the chopper wheel is configured to be irradiated by the collimated fan beam, in a rotation plane that is substantially non-perpendicular relative to a plane containing the collimated fan beam of incident radiation.

It will be understood that rotation of the chopper wheel can also be effected prior to producing the collimated fan beam of incident radiation. Furthermore, in some embodiments, effecting rotation of the chopper wheel includes causing the rotation with an angle between the rotation plane of the chopper wheel and the plane containing the collimated fan beam of incident radiation of less than 30°. The orientation of the fan beam and chopper wheel are further illustrated in FIGS. 3 and 4, for example. Furthermore, in some cases, the angle can be less than Effecting rotation of the chopper wheel can also include using a disk chopper wheel with a rim, a center, and one or more radial slits extending toward the rim of the disk and toward the center of the disk, with the slits configured to pass x-ray radiation from the collimated fan beam, as illustrated in FIGS. 3 and 4. Effecting rotation can also include using the disk chopper wheel with one or more tapered slips having greater width toward the rim of the disk than toward the center of the disc, as illustrated in FIG. 9, for example. Effecting rotation can likewise include using the disk chopper wheel with chamfering on at least two edges, or on all edges, of the one or more slits. Example chamfering is illustrated in FIG. 8.

Producing the collimated fan beam can include producing x-rays with end-point energies between about 50 keV and 500 keV. For example, x-rays with endpoint energies between about 200 keV and 250 keV can be produced In other embodiments, a procedure also includes detecting x-ray radiation backscattered by objects irradiated by the incident radiation having passed through the chopper wheel. For example, target objects that can be irradiated and the backscatter radiation detected can include the suitcase illustrated in FIG. 3 and the car illustrated in FIG. 1, for example. In some embodiments, detecting the backscatter x-ray radiation can include using one or more backscatter x-ray detectors mounted to an external surface of a vehicle, such as the external detector 110 in FIG. 1 or the detector 1110 in FIG. 11, for example. The backscatter detectors can be fixedly mounted to the exterior surface of the vehicle, and the backscatter detector can include a WSF detector.

Embodiment systems with angled chopper disks as described in this disclosure can have the following advantages, for example, over existing systems:
1. Greatly reduced weight, which is useful for high rotational speed disks made of tungsten and for hand-held systems.
2. Greatly reduced cost of the rotating disk, support bearings, and driving motor.
3. Faster spin-up times for the disk, useful for rapid deployment of inspection vehicles.
4. Lower gyroscopic effects of the spinning disk due to the greatly reduced moment of inertia.

The teachings of any patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An x-ray scanning system comprising:
   a movable x-ray source configured to produce incident x-ray radiation having end-point x-ray energy greater than about 200 keV; and
   a movable disk chopper wheel, configured to be irradiated by, and to attenuate, the incident x-ray radiation, the movable disk chopper wheel further defining one or more slits configured to pass the incident x-ray radiation through the movable disk chopper wheel for scanning a target.

2. The x-ray scanning system of claim 1, wherein the x-ray end-point energy is greater than about 250 keV.

3. The x-ray scanning system of claim 2, wherein the x-ray end-point energy is greater than about 400 keV.

4. The x-ray scanning system of claim 3, wherein the x-ray end-point energy is greater than about 450 keV.

5. The x-ray scanning system of claim 4, wherein the x-ray end-point energy is greater than about 500 keV.

6. The x-ray scanning system of claim 1, wherein the incident x-ray radiation is a collimated fan beam of incident x-ray radiation.

7. The x-ray scanning system of claim 6, wherein the movable disk chopper wheel is oriented with a wheel plane containing the movable disk chopper wheel substantially non-perpendicular relative to a beam plane containing the collimated fan beam of incident radiation.

8. The x-ray scanning system of claim 7, wherein an angle between the wheel plane and the beam plane is less than 30°.

9. The x-ray scanning system of claim 8, wherein the angle is less than 15°.

10. The x-ray scanning system of claim 1, wherein the movable disk chopper wheel includes a rim and a center, and wherein the one or more slits are radial and extend toward the rim and toward the center.

11. The x-ray scanning system of claim 10, wherein the one or more radial slits are tapered and have greater width toward the rim than toward the center.

12. The x-ray scanning system of claim 11, wherein the movable disk chopper wheel includes chamfering on at least two edges or on all edges of the one or more slits.

13. The x-ray scanning system of claim 1, wherein the movable x-ray source and the movable disk chopper wheel are configured to be mounted within a vehicle.

14. The x-ray scanning system of claim 13, further including one or more backscatter detectors mounted to the vehicle and configured to detect x-ray radiation backscattered by the target irradiated by the incident radiation having passed through the movable disk chopper wheel.

15. The x-ray scanning system of claim 14, wherein the one or more backscatter detectors are mounted to an external surface of a vehicle.

16. The x-ray scanning system of claim 1, being a hand-held system, wherein the movable x-ray source and the movable disk chopper wheel are configured to be mounted within the hand-held system.

17. An x-ray scanning system comprising:
- a movable x-ray source configured to produce incident x-ray radiation having end-point x-ray energy between about 200 keV and about 500 keV; and
- a movable disk chopper wheel, configured to be irradiated by, and to attenuate, the incident x-ray radiation, the movable disk chopper wheel further defining one or more slits configured to pass the incident x-ray radiation through the movable disk chopper wheel for scanning a target.

18. The x-ray scanning system of claim 17, being a vehicle system, wherein the movable x-ray source and the movable disk chopper wheel are configured to be mounted within the vehicle system.

19. The x-ray scanning system of claim 17, being a hand-held system, wherein the movable x-ray source and the movable disk chopper wheel are configured to be mounted within the hand-held system.

20. An x-ray scanning system comprising:
- a movable x-ray source configured to produce a collimated fan beam of incident x-ray radiation having end-point x-ray energy greater than about 500 keV; and
- a movable disk chopper wheel, configured to be irradiated by, and to attenuate, the incident x-ray radiation, the movable disk chopper wheel further defining one or more slits configured to pass the incident x-ray radiation through the movable disk chopper wheel for scanning a target.

21. The x-ray scanning system of claim 20, wherein the movable disk chopper wheel is oriented with a wheel plane containing the movable disk chopper wheel substantially non-perpendicular relative to a beam plane containing the collimated fan beam of incident radiation.

22. The x-ray scanning system of claim 21, wherein an angle between the wheel plane and the beam plane is less than 30°.

23. The x-ray scanning system of claim 20, being a vehicle system, wherein the movable x-ray source and the movable disk chopper wheel are configured to be mounted within the vehicle system.

24. The x-ray scanning system of claim 20, being a hand-held system, wherein the movable x-ray source and the movable disk chopper wheel are configured to be mounted within the hand-held system.

25. A method of x-ray scanning, the method comprising:
- producing incident x-ray radiation having end-point x-ray energy greater than about 200 keV;
- irradiating a movable disk chopper wheel with the incident x-ray radiation;
- attenuating the incident x-ray radiation with the movable disk chopper wheel; and
- passing the incident x-ray radiation through the movable disk chopper wheel through one or more slits to scan a target.

26. The method of x-ray scanning of claim 25, wherein the producing incident x-ray radiation, the irradiating the movable disk chopper wheel, the attenuating the incident x-ray radiation, and the passing the incident x-ray radiation are performed from within a vehicle.

27. The method of x-ray scanning of claim 25, wherein the producing incident x-ray radiation, the irradiating the movable disk chopper wheel, the attenuating the incident x-ray radiation, and the passing the incident x-ray radiation are performed from within a hand-held device.

* * * * *